(12) United States Patent
Remillard (10) Patent No.: US 7,856,801 B2
(45) Date of Patent: Dec. 28, 2010

(54) EXTRUDED BAT FOR THE REEL OF A CROP HARVESTING HEADER

(75) Inventor: Rheal G. Remillard, St. Joseph (CA)

(73) Assignee: MacDon Industries Ltd., Winnipeg, MB (CA)

( * ) Notice: Subject to any disclaimer, the term of this patent is extended or adjusted under 35 U.S.C. 154(b) by 0 days.

(21) Appl. No.: 12/437,154

(22) Filed: May 7, 2009

(65) Prior Publication Data

US 2010/0281840 A1 Nov. 11, 2010

(51) Int. Cl.
    *A01D 57/00* (2006.01)
(52) U.S. Cl. .............................. 56/220; 56/227; 56/364
(58) Field of Classification Search .................. 56/220, 56/400, 219, 227, 12.4, 364
    See application file for complete search history.

(56) References Cited

U.S. PATENT DOCUMENTS

| | | | | |
|---|---|---|---|---|
| 2,748,556 A | * | 6/1956 | Summers et al. | 56/400 |
| 2,840,975 A | * | 7/1958 | Koller | 56/219 |
| 3,157,019 A | * | 11/1964 | Brackbill | 56/400 |
| 3,158,976 A | * | 12/1964 | Scheidenhelm | 56/220 |
| 3,261,153 A | * | 7/1966 | Johnston | 56/400 |
| 3,468,109 A | * | 9/1969 | Reimer | 56/220 |
| 3,626,678 A | * | 12/1971 | Quam | 56/400 |
| 3,698,172 A | * | 10/1972 | Johnston | 56/400 |
| 3,796,030 A | * | 3/1974 | Neal et al. | 56/220 |
| 4,459,797 A | * | 7/1984 | Gessel et al. | 56/220 |
| 4,630,432 A | * | 12/1986 | Love et al. | 56/220 |
| 4,776,155 A | | 10/1988 | Fox | |
| 4,901,511 A | * | 2/1990 | Yarmashev et al. | 56/220 |
| 6,324,823 B1 | | 12/2001 | Remillard | |
| 7,124,564 B2 | * | 10/2006 | Glazik et al. | 56/220 |

FOREIGN PATENT DOCUMENTS

| | | | |
|---|---|---|---|
| JP | 07213141 A | * | 8/1995 |
| JP | 2005211010 A | * | 8/2005 |

* cited by examiner

*Primary Examiner*—Árpád Fábián-Kovács
(74) *Attorney, Agent, or Firm*—Adrian D. Battison; Ade & Company Inc (57) ABSTRACT

A removable bat attachment to be applied when required over the tine tubes and fingers of reel of a harvesting machine is formed by an elongate flexible plastic extruded member having a first wall lying against the leading face of the plurality of fingers, a second wall at the inner edge of the first wall wrapping around the tine tube to define a generally cylindrical channel shaped receptacle to receive the tine tube therein and a third wall at the outer edge. In one arrangement the outer edge wraps around an outer end of the fingers and is snap fit onto the outer ends of the fingers and on to the tine tube so as to be held in place thereon by the snap fit. In another arrangement the outer edge has an end wall with a series of holes one for each finger so that the fingers project outwardly from the outer edge.

26 Claims, 4 Drawing Sheets

EXTRUDED BAT FOR THE REEL OF A CROP HARVESTING HEADER

This invention relates to a crop harvesting header of the type including a pickup reel and particularly to an arrangement for mounting a removable optional bat onto the fingers on the support tube of a bat of the reel.

BACKGROUND OF THE INVENTION

The conventional harvesting header comprises a frame for mounting on a crop harvesting machine for movement across ground carrying a crop to be harvested, the frame defining a working width of the header, a table mounted on the frame across the width of the header for receiving the crop when cut for transportation along the header, a cutting knife along a front edge of the table for cutting the crop and a pickup reel mounted above the knife and the table for controlling the crop as it moves onto the table. The reel comprises a main elongate support beam and a plurality of tine tubes at angularly spaced positions around the main beam. The tine tubes can be divided into shorter lengths than the full length of the reel with each tine tube extending between tine tube supports on the reel. The tine tubes typically carry tines or fingers at spaced positions along the length of the tine tube.

A reel of this type is shown in U.S. Pat. No. 4,776,155 (Fox) issued Oct. 11th, 1988 and assigned to the present assignees. The tine tube in this arrangement is formed from shaped sheet metal and defining a cylindrical section along one edge of the tube so that the cylindrical section can be connected end to end to other such tubes by short connecting pipe sections. The pipe sections and the cylindrical section thus define an axis around which the tine tube rotates. Each finger is inserted into a pocket defined in the sheet metal tube so as to project outwardly in a radial plane of the axis. Each finger is formed from a molded plastics element defining a single thickness with a slight curvature toward the tip. A button on one end of the finger projects into a hole in the tube to latch the finger in place.

In an alternative construction also previously used, which supersedes that shown in the above patent, there is provided a main longitudinal tine tube forming the base structure onto which is welded a plurality of sheet metal holders each for holding a finger of the construction shown in the above patent.

These arrangements have some disadvantage in that the sheet metal elements are relatively expensive and in that they mount only a single thickness or strip of the finger so that there is a tendency of the finger to break at or adjacent the edge of the sheet metal element.

A less expensive construction comprises a coiled wire arrangement which defines two parallel spaced fingers connected by a central helical coil section which wraps around the tube. The central coil section is then bolted to the tube by a bolt which passes through diametrically opposed punched holes in the tube. The head of the bolt thus holds down the central section of the coil thus holding the coil in place and maintaining the fingers at a predetermined angular orientation around the axis of the tube. This arrangement has some disadvantage in that, while it is cheap and easy to manufacture, the use of metal parts on the reel is disadvantageous in that any broken fingers or pieces of finger which enter the crop material pass into and through the combine harvester on which the header is mounted with significant danger of damage to the threshing system.

Another prior art construction manufactured by HCC Inc of Mendota Ill. comprises a molded plastic finger which has integrally molded with the finger portion a mounting portion in the form of a collar. The collar wraps wholly around the tube and is squeezed in place by a screw which clamps together two ends of the collar. In order to prevent rotation of the collar on the tube, there is provided a single molded projection extending radially inwardly from an otherwise cylindrical surface of the collar so as to engage into a hole in the tube. This arrangement has the disadvantage in that it is relatively weak. It is desirable to provide a mounting which allows a user to attach either the wire coil arrangement or the plastic finger depending upon the requirements in particular crop conditions.

In U.S. Pat. No. 6,324,823 by the present inventor and assigned to the present assignees and issued on Dec. 4, 2001 there is shown a crop harvesting header includes a reel mounted on a pair of forwardly extending arms carried on a header frame above a table and cutting knife. The reel is rotatable about a longitudinal axis and includes tine tubes with fingers which pivot each about a respective tube axis so the angle of the fingers varies as the reel rotates. Each finger has a finger portion of I shape in cross-section and a mounting collar. The collar only partly surrounds the tube so as to have a portion which can flex open to allow the collar to be wrapped around the tube. A bolt clamps the collar onto the tine tube.

In addition to the above designs, many other proposals have been made for attachment of the fingers to the tine tube for rotational and pivoting movement of the fingers as the reel rotates. Fingers are typically spaced at a distance of 4 to 7 inches.

In other arrangements, instead of the spaced fingers, bats are used where the element projecting from the tine tube or support is a bat or elongate flap member. While the fingers are generally accepted as a more suitable device to effect pick up of crop during cutting to carry the crop over the cutting knife to the table or draper, in some conditions of light crop the fingers can pass between the stems of the light crop and thus miss engaging the stems. Thus the fingers are more effective with crop which forms a sufficiently dense crop mat for the fingers to engage and carry the crop. However the fingers become ineffective when the crop is very light with the result that the plants then sit on the cutter bar or fall back to the ground resulting in an unacceptable high percentage of crop loss, thus exacerbating the already low crop production in the light crop conditions.

Some attempts to resolve this problem have been tried using web tipped fingers which are attached in replacement for the conventional narrow fingers but the change-over from one configuration to the other is quite time consuming. Bolt-on bats are also provided by some manufacturers which are formed of sheet metal or plastic and are attached to the individual fingers by u-bolts or clamps. However again the attachment of these arrangements is time consuming and difficult.

SUMMARY OF THE INVENTION

It is one object of the invention to provide an improved bat attachment for the reel of a harvesting machine.

According to one aspect of the invention there is provided a reel of a harvesting machine comprising:

a reel hub arranged for rotation around a reel axis;

a plurality of tine tubes at angularly spaced positions around the reel hub with each extending longitudinally of the reel axis;

a plurality of tine tube supports arranged at longitudinally spaced positions along the reel hub and each extending radially outwardly from the hub for providing support for the tine tubes at spaced positions along the length of the tine tubes;

each tine tube having a plurality of fingers mounted at longitudinally spaced positions on the tine tube so as to extend from the tine tube generally outwardly from the reel axis and generally in a radial plane of the axis;

the fingers being aligned along the tube with a leading face of each finger facing around the axis in an angularly leading direction and an opposed trailing face of each finger facing around the axis in an angularly trailing direction;

and a plurality of bat attachments each for mounting on a plurality of the fingers and the tine tube of a respective one of the tine tubes, the bat attachment comprising:

an elongate extruded member having:

a bat wall arranged to lie against one of the leading and trailing faces of the plurality of fingers with an inner edge of the bat wall at the tine tube and an outer edge of the bat wall spaced outwardly from the inner edge;

a connecting wall at the inner edge arranged to wrap around the tine tube to define with an inner portion of the bat wall a channel shaped receptacle to receive the tine tube therein;

the outer edge of the bat wall including elements thereon for engaging the plurality of fingers to hold the outer edge at a position fixed relative to the fingers for movement therewith.

In one arrangement the elongate extruded member is arranged so as to be a snap fit onto the tine tube so as to be held in place thereon by the snap fit.

In this arrangement preferably the elongate extruded member is arranged so as to cover the ends of the fingers and wherein the elements at the outer edge comprise a channel defined by the outer edge of the bat wall and a second wall confining the other of the leading and trailing surfaces of the fingers.

In this arrangement preferably the elongate extruded member is held in place by the channel surrounding the ends of the fingers and the channel shaped receptacle receiving the tine tube.

However it will be appreciated that the snap fastening arrangement does not necessarily require close engagement between the surfaces at all locations provided the snap fastening action holds the bat attachment firmly in place and against sliding movement away from the tine tube.

Preferably the first wall is shaped to closely follow the leading faces of the fingers so that on the leading faces there is a continuous wall from the tube to the tips of the fingers. However the attachment can be mounted in the reverse direction with the complete first wall trailing rather than leading.

Thus preferably the first wall has a concave outer surface to match the concave shape of the leading face of the fingers.

Preferably the first wall has a plurality of longitudinally extending ribs therealong so as to provide a stiffening effect along the first wall between the fingers. The ribs also provide an expansion element to allow for variations in fingers and/or bat.

Preferably at least one of the second and third walls has an outwardly extending lip along the edge thereof.

Preferably each finger includes a finger portion and a mounting portion at least partly engaged around the tube from which the finger portion extends and wherein the finger portion and the mounting portion are molded integrally from a plastics material.

Preferably the mounting portion extends only partly around the tube leaving an open portion and wherein the collar is molded from a plastics material which is resiliently deformable allowing the open portion to be opened further by flexing of the collar to engage the collar and the projections around the tube.

Preferably each bat attachment has a length to extend between two of the tine tube supports. Thus preferably the attachment can be supplied in a long extruded length and cut to the required length to fit between the tine tube supports.

Thus an extruded plastic bat shape is cut to length to match the distance between the tine tube supports and is pulled over the tip of the fingers and then over the tine tube to be clipped in place and held by the flexibility of the plastic. The bat shape thus is snapped into place on the existing tube and fingers and acts as a solid bat to more effectively engage the crop in a similar manner to a conventional bat reel to carry a light crop over the cutter bar into the header.

According to a second aspect of the invention there is provided a reel of a harvesting machine comprising:

a reel hub arranged for rotation around a reel axis;

a plurality of tine tubes at angularly spaced positions around the reel hub with each extending longitudinally of the reel axis;

a plurality of tine tube supports arranged at longitudinally spaced positions along the reel hub and each extending radially outwardly from the hub for providing support for the tine tubes at spaced positions along the length of the tine tubes;

each tine tube having a plurality of fingers mounted at longitudinally spaced positions on the tine tube so as to extend from the tine tube generally outwardly from the reel axis and generally in a radial plane of the axis;

the fingers being aligned along the tube with a leading face of each finger facing around the axis in an angularly leading direction and an opposed trailing face of each finger facing around the axis in an angularly trailing direction;

and a plurality of bat attachments each for mounting on a plurality of the fingers and the tine tube of a respective one of the tine tubes;

the bat attachments being removable from the fingers and the tine tube leaving the fingers mounted on the tine tubes for use without the bat attachment;

the bat attachment comprising:

a bat wall arranged to lie against one of the leading and trailing faces of the plurality of fingers with an inner edge of the bat wall at the tine tube and an outer edge of the bat wall spaced outwardly from the inner edge;

a connecting wall at the inner edge arranged to engage the tine tube;

the outer edge of the bat wall including elements thereon for engaging the plurality of fingers to hold the outer edge at a position fixed relative to the fingers for movement therewith;

the outer edge being arranged at a position spaced inwardly from an outer end of the fingers with the fingers projecting beyond the bat wall.

Preferably there is provided an end wall at the outer edge with a plurality of holes through each of which a respective one of the fingers projects. However other fasteners can be provided which engage around the fingers to hold the bat wall in place.

Preferably there is provided a channel defined by the outer edge of the bat wall, the end wall and a second wall engaging the other of the leading and trailing surfaces of the fingers since this acts to hold the bat attachment more effectively in place on the fingers and tine tube.

Preferably the connecting wall member is fastened to the tine tube by fastener elements engaged into the tine tube. This holds the inner end of the bat attachment in place while the outer ends are held by the engagement with the fingers.

Preferably the bat wall is shaped to closely follow the leading faces of the fingers so that it has a concave outer surface.

Preferably each bat attachment comprises an elongate extruded member although other methods of manufacture may be used.

This arrangement of bat attachment does not necessarily require the expansion feature provide by the longitudinal ribs since fingers are allowed to poke through the bottom end or end wall of the bat but it could have the ribs for stiffness if required.

The fastening of this arrangement to the fingers and tine tube may require some additional fastening with self drilling/ tapping screws attaching the top curl around tine tube. Screws can be placed just below the tine tube to prevent possible loading from crop against bottom edge of bat thus forcing it up and disengaging it from the tine tube.

The portion of finger exposed can be of the order of 100 mm of finger exposed below the bat, but longer or shorter exposed portions can be provided.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Reel constructions are well known and can be of many different designs. Examples are shown in U.S. Pat. No. 4,776, 155 (Fox) and in U.S. Pat. No. 6,591,598 (Remillard) both assigned to the present Assignees to which reference may be made for further details of suitable constructions.

Figures 1, 2:
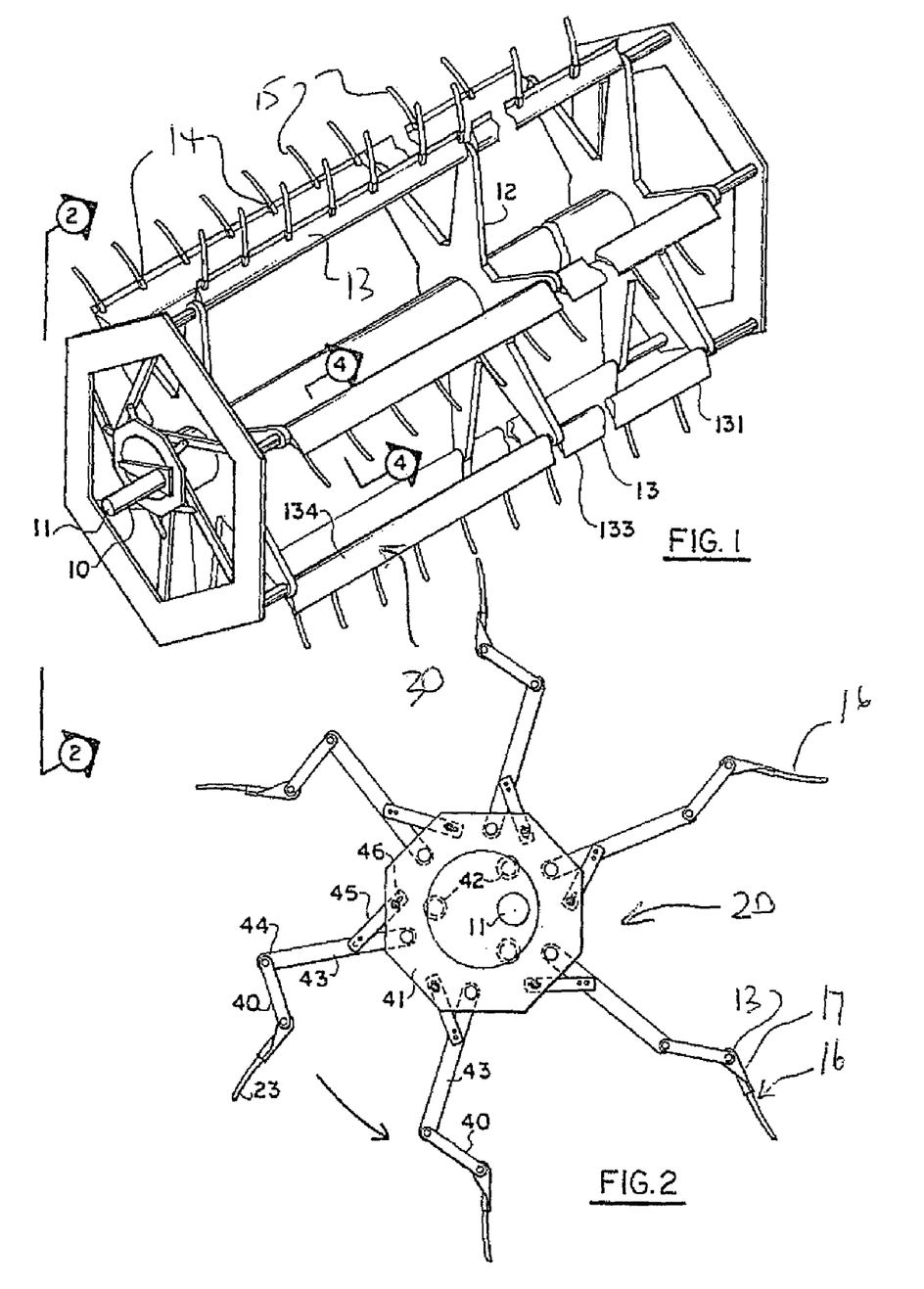
FIG. 1 is an isometric view showing in general a reel of the type with which the present invention is concerned.
FIG. 2 is an end elevational view of the reel of FIG. 1.

One example is shown in FIGS. 1 and 2 herein and comprises a reel for a harvester which can be a swather or a combine harvester includes a shaft 10 mounted on bearings 11 carried by a pair of reel arms (not shown). The remainder of the machine including the reel arms is or can be of a conventional form and therefore is not shown or described in detail herein.

The shaft 10 carries a plurality of outwardly extending arms or tine tube supports 12 which support at their periphery a plurality of tine tubes 13 for rotation with the arms and the shaft relative to the bearings 11. The reel design may have five or six such bats and it will be appreciated that this number can be varied in accordance with design requirements. Each tube comprises a plurality of tube sections 131, 132, 133, 134 each of which is supported at respective ends on a coupling and bearing arrangement attached to respective one of the supports 12. The bearing arrangement enables the tube to pivot about a bat axis parallel to the shaft 10 and passing through the end of the arm 12 so as to vary the angle of the bat relative to a radial plane passing through the respective arms 12. Each tube 13 of the bats has a plurality of finger mounting locations 14, at each of which is mounted a respective one or plurality of bat fingers 15. Each finger comprises an elongate finger portion 16 and a mounting portion 17 which attaches the finger portion to the tube.

Each bat tube 13 is mounted for pivotal movement about its bat axis with the movement being controlled by a mechanism generally indicated at 20 which acts to pivot the tube about the axis so that its angle around the reel axis varies so as to advance and retard the bat fingers at different angular positions around the reel axis.

As these elements of the bat and the reel are well known from the prior art and can be varied in accordance with various design arrangements well known to one skilled in the art, no detailed description is provided in this application.

Figure 3:
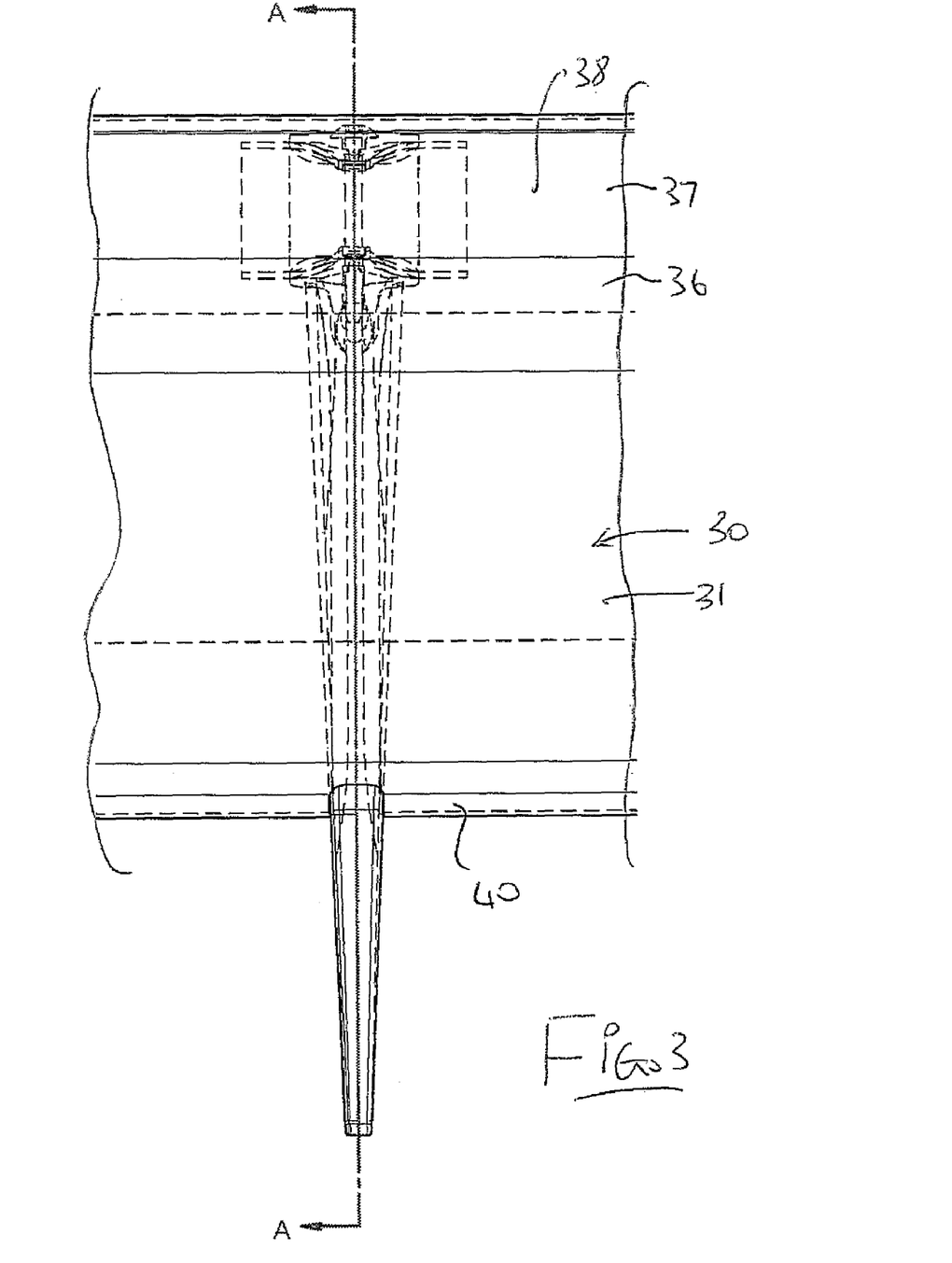
FIG. 3 top plan view partly in phantom of a part of the tine tube and one finger of the reel of FIG. 1 showing a first embodiment of the bat attachment of the present invention.
Figure 4:
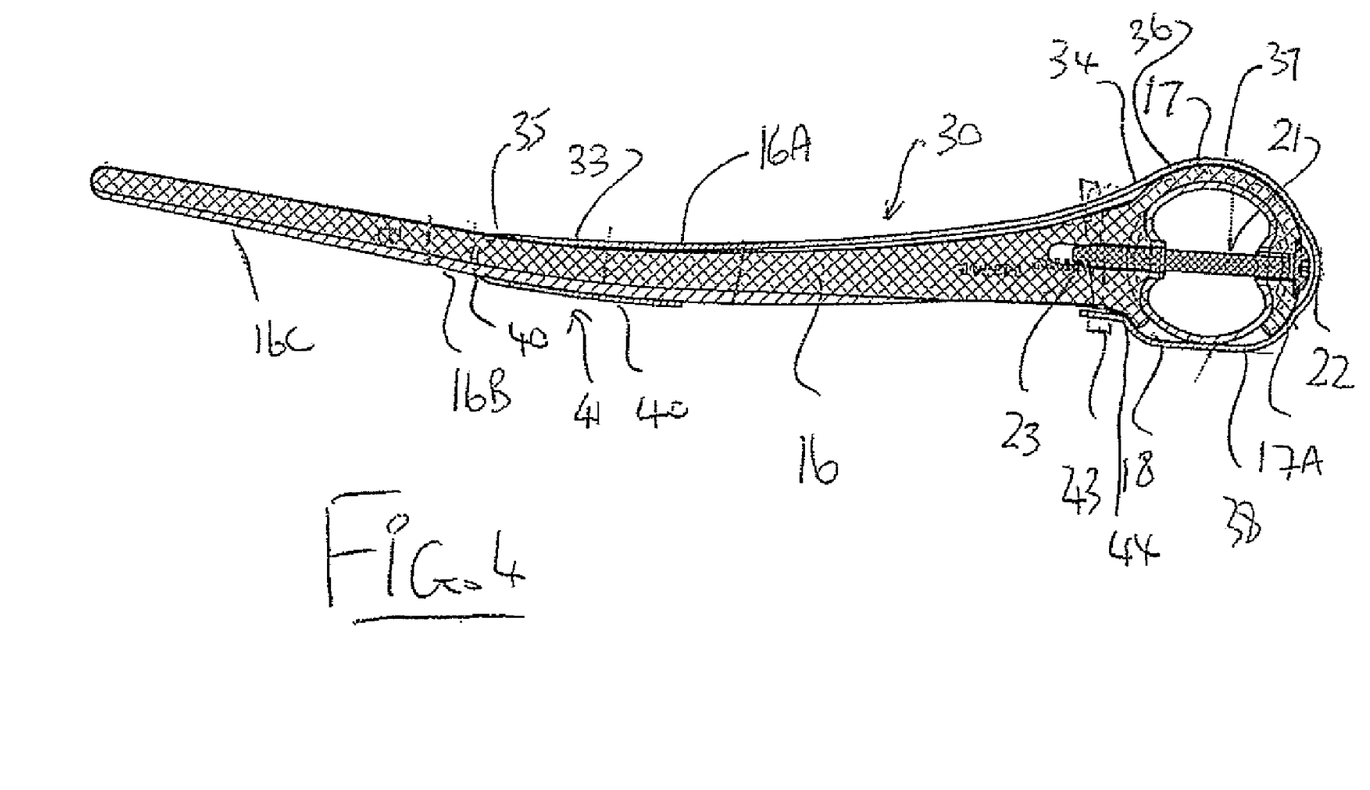
FIG. 4 is a cross sectional view along the lines A-A of FIG. 3.

Turning now to FIGS. 3 and 4, each finger includes the finger portion 16 and the mounting portion 17 partly engaged around the cylindrical tube 13 from which the finger portion extends. The finger portion and the mounting portion are molded integrally from a plastics material. The mounting portion 17 forms a collar 17A which extends only partly around the tube leaving an open portion 18 and with the collar being molded from a plastics material which is resiliently deformable allowing the open portion 18 to be opened further by flexing of the collar to engage the collar around the tube. The collar is held in place by a screw 21 which extends from a head 22 into the tube 13 and through the tube 13 to engage into a threaded receptacle 23 in the base of the finger 16.

Each tine tube 13 has a plurality of the fingers mounted at longitudinally spaced positions on the tine tube so as to extend from the tine tube generally outwardly from the reel axis and generally in a radial plane of the axis. The fingers 16 are generally aligned along the tube 13 with a leading face 16A of each finger facing around the axis in an angularly leading direction and an opposed trailing face 16B of each finger facing around the axis in an angularly trailing direction. The leading face 16A is concave and the trailing face 16B is convex.

The arrangement of the present invention comprises a plurality of bat attachments 30 each for mounting on a plurality of the fingers 16 and the tine tube 13. Each bat attachment comprises an elongate extruded member 31 formed of a plastics material. The attachment is cut to length so as to engage over the tube and fingers of a bat between two of the supports 12. Further attachments are applied over the further portions of each bat so that all the fingers and tubes of the complete reel are covered by the bat attachments.

The extruded member has a first wall 33 arranged to lie the leading face 16A of the plurality of fingers. Thus it has a common concave shape with the fingers and engages each finger and bridges the space between the fingers.

The first wall 33 has an inner edge 34 of the first wall at the tine tube so that the inner edge of the wall 33 rests against the commencement of the collar portion 17. The first wall 33 has an outer edge 35 of the first wall spaced inwardly from an outer end or tip 16C of the fingers.

A second wall 37 at the inner edge 34 is arranged to wrap around the tine tube to define with an inner portion 36 of the first wall at the edge 34 a first generally cylindrical channel shaped receptacle 38 to receive the tine tube and the collar 17 therein.

A third wall 40 at the outer edge is arranged to pass between the fingers to define with an outer portion of the first bat wall 33 adjacent the edge 35 and a rear wall 35A second channel shaped receptacle 41.

The first channel shaped receptacle 41 is arranged so that the bat wall 33 closely engages the leading face 16A of the fingers at a position spaced inwardly from the outer end thereof and the rear wall 40 closely engages the trailing face 16B of the fingers at a position spaced inwardly from the outer end thereof. The second cylindrical channel shaped receptacle 38 is arranged to closely engage the tine tube so that it has a generally matching diameter.

The attachment is shaped to closely follow the shape of the fingers and tine tube so that the first wall 33 has a slightly concave outer surface and the wall 40 has a slightly convex outer surface.

The wall 35 has a series of spaced holes therealong each arranged to receive an end portion of a respective one of the fingers projecting therethrough. Thus the bat attachment is held in place by engagement of the wall 33 with the leading face of the fingers and the wall 40 with the trailing face of the fingers. The portion 38 wraps around the tine tube and is fastened to the tine tube by a plurality of screw fasteners 43 which passes through the end lip 44 of the portion and engages into selected ones of the fingers. For sufficient attachment of the bat attachment to the tine tube, typically three fasteners 43 can be used at the ends and middle of the attachment.

These fasteners co-operate with the engagement of the wall 35 on the fingers and the wrapping of the portion 38 around the tine tube to hold the attachment in place with very limited time to complete the fastening.

The use of a bat attachment with the projecting finger portions is found to provide the necessary sweeping action of the crop over the knife while the finger portions can engage lying crop in a manner which is more aggressive than the mere end of the bat.

Figure 5:
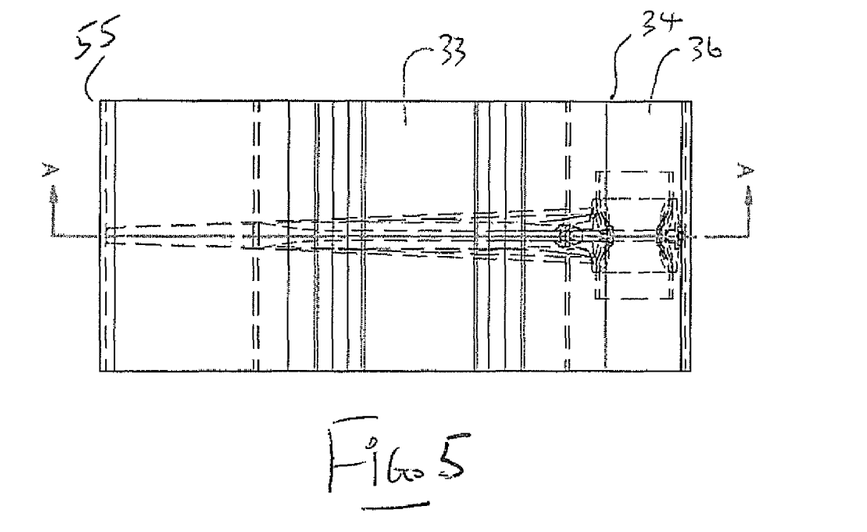
FIG. 5 top plan view partly in phantom of a part of the tine tube and one finger of the reel of FIG. 1 showing a second embodiment of the bat attachment of the present invention.
Figure 6:
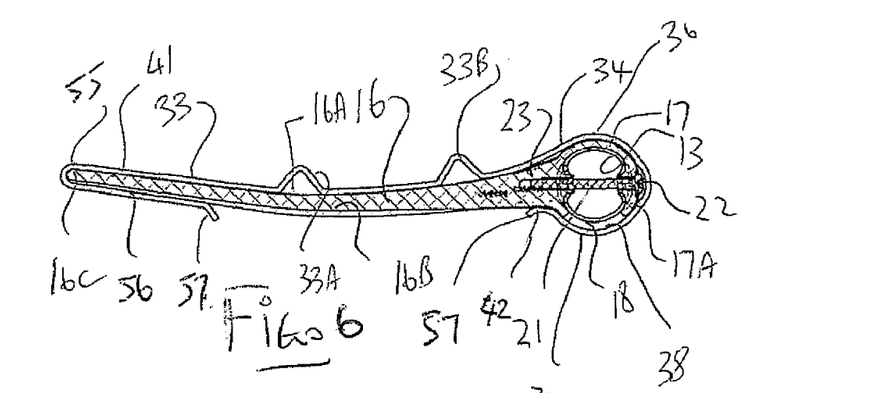
FIG. 6 is a cross sectional view along the lines A-A of FIG. 5.
Figure 7:
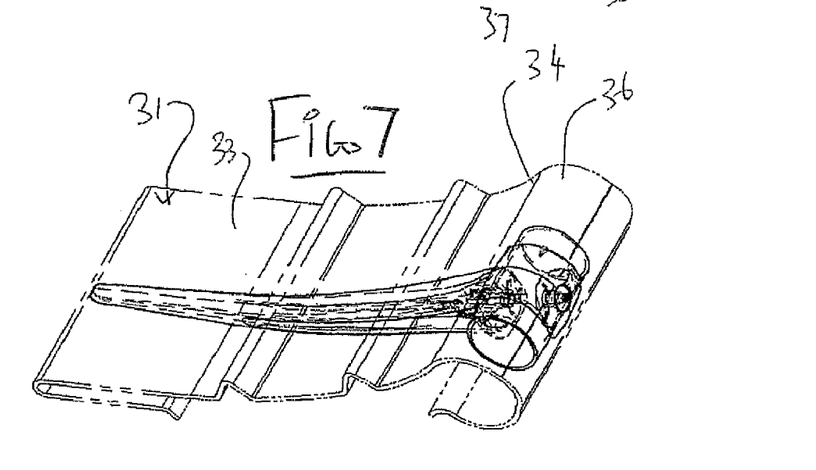
FIG. 7 is an isometric view of the part of FIG. 5.

In FIGS. 5, 6 and 7 is provided an alternative arrangement in which the bat attachment covers the whole of the finger. In this arrangement the outer edge of the wall 33 is located at the outer ends of the fingers and the channel defined by the outer portion 41, the outer wall 55 and the rear portion 56 closely surrounds the tips.

In this arrangement, the elongate extruded member is arranged so as to be a snap fit onto the outer ends of the fingers and on to the tine tube so as to be held in place thereon by the snap fit thus avoiding the need for the screw fastener. In particular the outer channel 41 can be engaged onto all of the fingers to be covered and the inner channel 38 flexed to engage over the tine tube 13 and the mounting collar 17. The length of the inner wall 33 is such that the flexing can occur sufficiently to allow the edge 42 of the wall 37 to pass over the tine tube without damage to the structure of the extruded member. In order to assist in engaging the walls 56 and 33 into place on the fingers and tine tube respectively, each of the second and third walls has an outwardly extending lip 57 along the edge thereof.

The first wall 33 has a pair of longitudinally extending ribs 33A and 33B therealong formed by recessing a part of the wall away from the fingers without increasing the thickness of the wall. These ribs act to provide stiffness in the wall 33 so that it can bridge between the fingers and provide engagement with the crop as required without significant deformation. It also allows for expansion of the wall 33 to match the length of the fingers in the case where longer fingers are present while pulling the inner and outer channels tight on the finger and tine tube combination.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A combination comprising:
a reel of a harvesting machine comprising:
   a reel hub arranged for rotation around a reel axis;
   a plurality of tine tubes at angularly spaced positions around the reel hub with each extending longitudinally of the reel axis;
   a plurality of tine tube supports arranged at longitudinally spaced positions along the reel hub and each extending radially outwardly from the hub for providing support for the tine tubes at spaced positions along the length of the tine tubes;
   each tine tube having a plurality of tine fingers at longitudinally spaced positions;
   a mounting assembly for mounting the tine fingers on the tine tube so as to extend from the tine tube generally outwardly from the reel axis and generally in a radial plane of the axis;
   the tine fingers being aligned along the tube with a leading face of each tine finger facing around the axis in an angularly leading direction and an opposed trailing face of each tine finger facing around the axis in an angularly trailing direction;
and a plurality of separate bat attachments;
the bat attachments being separate from the tine tube, tine fingers and mounting assembly enabling the bat attachments to be removed from the tine tube allowing the reel to operate on the harvesting machine with the tine fingers engaging the crop;
the bat attachments each being arranged for mounting on a plurality of the tine fingers and the tine tube of a respective one of the tine tubes enabling the bat attachments to be attached to the tine tube and tine fingers allowing the reel to operate on the harvesting machine with at least the bat attachment engaging the crop;
each bat attachment comprising an elongate extruded member having:
   a bat wall which extends outwardly from the tine tube contacting against one of the leading and trailing faces of the plurality of tine fingers with an inner edge of the bat wall at the tine tube and an outer edge of the bat wall spaced outwardly along the tine fingers from the inner edge;
   a connecting wall at the inner edge which wraps around the tine tube and defines with an inner portion of the bat wall a channel shaped receptacle engaged around the tine tube;
   the outer edge of the bat wall including elements engaging the plurality of tine fingers at a position on the tine fingers spaced outwardly from the mounting assembly to hold the outer edge at a position fixed relative to the tine fingers for movement therewith.

2. The reel according to claim 1 wherein the bat attachment is a snap fit onto the tine tube so as to be held in place thereon by the snap fit.

3. The reel according to claim 1 wherein the bat attachment covers the ends of the tine fingers and wherein the elements at the outer edge comprise a channel defined by the outer edge of the bat wall and a second wall confining the other of the leading and trailing surfaces of the tine fingers.

4. The reel according to claim 1 wherein the bat attachment is held in place by the outer edge surrounding the ends of the tine fingers and the inner edge receiving the tine tube.

5. The reel according to claim 1 wherein the outer edge is arranged to closely engage the leading and trailing faces of the tine fingers at the outer ends thereof and wherein the inner edge is arranged to closely engage the tine tube.

6. The reel according to claim 1 wherein the inner edge is generally part cylindrical.

7. The reel according to claim 1 wherein the bat attachment is arranged so that end portions of the tine fingers project through holes in an end wall at the outer edge.

8. The reel according to claim 1 wherein the bat attachment is fastened to the tine tube or to the tine fingers by fastener elements engaged into the tine tube or the tine fingers.

9. The reel according to claim 1 wherein the bat wall is shaped to closely follow the leading faces of the tine fingers.

10. The reel according to claim 1 wherein the bat wall is concave.

11. The reel according to claim 1 wherein the bat wall has a plurality of longitudinally extending ribs therealong.

12. The reel according to claim 1 wherein each tine finger includes a finger portion and a mounting portion at least partly engaged around the tube from which the finger portion extends and wherein the finger portion and the mounting portion are molded integrally from a plastics material.

13. The reel according to claim 12 wherein the mounting portion extends only partly around the tube leaving an open portion and wherein the mounting portion is molded from a plastics material which is resiliently deformable allowing the open portion to be opened further by flexing of the mounting portion.

14. The reel according to claim 1 wherein each bat attachment has a length to extend between two of the tine tube supports.

15. A combination comprising:
a reel of a harvesting machine comprising:
a reel hub arranged for rotation around a reel axis;
a plurality of tine tubes at angularly spaced positions around the reel hub with each extending longitudinally of the reel axis;
a plurality of tine tube supports arranged at longitudinally spaced positions along the reel hub and each extending radially outwardly from the hub for providing support for the tine tubes at spaced positions along the length of the tine tubes;
each tine tube having a plurality of tine fingers at longitudinally spaced positions;
a mounting assembly for mounting the tine fingers on the tine tube so as to extend from the tine tube generally outwardly from the reel axis and generally in a radial plane of the axis;
the tine fingers being aligned along the tube with a leading face of each tine finger facing around the axis in an angularly leading direction and an opposed trailing face of each tine finger facing around the axis in an angularly trailing direction;
and a plurality of separate bat attachments
the bat attachments being separate from the tine tube, tine fingers and mounting assembly enabling the bat attachments to be removed from the tine tube allowing the reel to operate on the harvesting machine with the tine fingers engaging the crop;
the bat attachments each being arranged for mounting on a plurality of the fingers and the tine tube of a respective one of the tine tubes enabling the bat attachments to be attached to the tine tube and fingers allowing the reel to operate on the harvesting machine with at least the bat attachment engaging the crop;
the bat attachments being removable from the tine fingers and the tine tube leaving the fingers mounted on the tine tubes for use without the bat attachment;
each bat attachment comprising a bat wall which extends outwardly from the tine tube contacting against one of the leading and trailing faces of the plurality of tine fingers with an inner edge of the bat wall at the tine tube and an outer edge of the bat wall spaced outwardly from the inner edge;
a connecting wall at the inner edge which engages the tine tube;
the outer edge of the bat wall including a plurality of holes at spaced positions therealong through each of which a respective one of the fingers projects thereby engaging the outer edge with the plurality of tine fingers at a position on the tine fingers spaced outwardly from the mounting assembly to hold the outer edge at a position fixed relative to the tine fingers for movement therewith;
the outer edge being spaced inwardly from an outer end of the tine fingers with the tine fingers projecting beyond the bat wall.

16. The reel according to claim 15 wherein there is provided a channel defined by the outer edge of the bat wall, the end wall and a second wall engaging the other of the leading and trailing surfaces of the fingers.

17. The reel according to claim 15 wherein the connecting wall is fastened to the tine tube by fastener elements engaged into the tine tube.

18. The reel according to claim 15 wherein the connecting wall is part cylindrical.

19. The reel according to claim 15 wherein the bat wall is shaped to closely follow the leading faces of the tine fingers.

20. The reel according to claim 15 wherein the bat wall has a concave outer surface.

21. The reel according to claim 15 wherein each finger includes a finger portion and a mounting portion at least partly engaged around the tube from which the finger portion extends and wherein the finger portion and the mounting portion are molded integrally from a plastics material.

22. The reel according to claim 21 wherein the mounting portion extends only partly around the tube leaving an open portion and wherein the mounting portion is molded from a plastics material which is resiliently deformable allowing the open portion to be opened further by flexing of the mounting portion.

23. The reel according to claim 15 wherein each bat attachment has a length to extend between two of the tine tube supports.

24. The reel according to claim 15 wherein each bat attachment comprises an elongate extruded member.

25. A combination comprising:
a reel of a harvesting machine comprising:
a reel hub arranged for rotation around a reel axis;
a plurality of tine tubes at angularly spaced positions around the reel hub with each extending longitudinally of the reel axis;
a plurality of tine tube supports arranged at longitudinally spaced positions along the reel hub and each extending radially outwardly from the hub for providing support for the tine tubes at spaced positions along the length of the tine tubes;
each tine tube having a plurality of tine fingers at longitudinally spaced positions;
a mounting assembly for mounting the tine fingers on the tine tube so as to extend from the tine tube generally outwardly from the reel axis and generally in a radial plane of the axis;
the tine fingers being aligned along the tube with a concave leading face of each tine finger facing around the axis in an angularly leading direction;
and a plurality of separate bat attachments;

the bat attachments being separate from the tine tube, tine fingers and mounting assembly enabling the bat attachments to be removed from the tine tube allowing the reel to operate on the harvesting machine with the tine fingers engaging the crop;

the bat attachments each being arranged for mounting on a plurality of the fingers and the tine tube of a respective one of the tine tubes enabling the bat attachments to be attached to the tine tube and fingers allowing the reel to operate on the harvesting machine with at least the bat attachment engaging the crop;

each bat attachment comprising an elongate extruded member having:

a concave bat wall which extends outwardly from the tine tube contacting against the concave leading faces of the plurality of tine fingers with an inner edge of the bat wall at the tine tube and an outer edge of the bat wall spaced outwardly along the tine fingers from the inner edge;

a part cylindrical connecting wall at the inner edge which wraps around the tine tube as a snap fit onto the tine tube;

the outer edge of the bat wall including a plurality of holes at spaced positions therealong through each of which a respective one of the fingers projects thereby engaging the outer edge with the plurality of tine fingers at a position on the tine fingers spaced outwardly from the mounting assembly to hold the outer edge at a position fixed relative to the tine fingers for movement therewith;

the outer edge being spaced inwardly from an outer end of the tine fingers with the tine fingers projecting beyond the bat wall.

26. A bat attachment for attachment to a reel of a harvesting machine having a reel hub arranged for rotation around a reel axis, a plurality of tine tubes at angularly spaced positions around the reel hub with each extending longitudinally of the reel axis, a plurality of tine tube supports arranged at longitudinally spaced positions along the reel hub and each extending radially outwardly from the hub for providing support for the tine tubes at spaced positions along the length of the tine tubes, wherein each tine tube has a plurality of tine fingers at longitudinally spaced positions, a mounting assembly for mounting the tine fingers on the tine tube so as to extend from the tine tube generally outwardly from the reel axis and generally in a radial plane of the axis, where the tine fingers are aligned along the tube with a concave leading face of each tine finger facing around the axis in an angularly leading direction; the bat attachment comprising:

an elongate extruded member having:

a concave bat wall which extends outwardly from the tine tube for contacting against the concave leading faces of the plurality of tine fingers;

a part cylindrical connecting wall at an inner edge which is arranged to wrap around the tine tube as a snap fit onto the tine tube;

an outer edge of the bat wall including a plurality of holes at spaced positions therealong through each of which a respective one of the fingers can project;

the bat attachment being separate from the tine tube, tine fingers and mounting assembly enabling the bat attachments to be removed from the tine tube allowing the reel to operate on the harvesting machine with the tine fingers engaging the crop;

the bat attachment being arranged for mounting on a plurality of the fingers and the tine tube of a respective one of the tine tubes enabling the bat attachments to be attached to the tine tube and fingers allowing the reel to operate on the harvesting machine with at least the bat attachment engaging the crop.

\* \* \* \* \*